United States Patent [19]

Iapicco

[11] Patent Number: 5,199,095
[45] Date of Patent: Mar. 30, 1993

[54] FIBEROPTIC CABLE FEEDTHROUGH FASTENER AND METHOD FOR FORMING SAME

[75] Inventor: Roger Iapicco, Little Ferry, N.J.

[73] Assignee: Computer Crafts, Inc., Hawthorne, N.J.

[21] Appl. No.: 849,749

[22] Filed: Mar. 12, 1992

Related U.S. Application Data

[63] Continuation-in-part of Ser. No. 696,238, May 6, 1991.

[51] Int. Cl.$^5$ ............................................. G02B 6/36
[52] U.S. Cl. ...................................... 385/100; 385/86
[58] Field of Search .................... 385/86, 87, 76, 77, 385/100

[56] References Cited

U.S. PATENT DOCUMENTS

| | | | |
|---|---|---|---|
| 4,216,930 | 8/1980 | Rossler, Jr. et al. | 248/56 |
| 4,648,688 | 3/1987 | Ashman et al. | 385/87 |
| 4,717,231 | 1/1988 | Dewez et al. | 350/96.2 |
| 4,730,890 | 5/1988 | Kashimura et al. | 350/96.2 |
| 4,738,505 | 4/1988 | Jones | 385/86 |
| 4,812,004 | 5/1989 | Biederstedt et al. | 350/96.2 |
| 4,875,881 | 10/1989 | Caveny et al. | 439/535 |
| 5,009,474 | 8/1991 | Wurmser et al. | 350/96.2 |
| 5,125,060 | 6/1992 | Edmundson | 385/100 |

*Primary Examiner*—John D. Lee
*Assistant Examiner*—John Ngo
*Attorney, Agent, or Firm*—Eugene G. Reynolds

[57] ABSTRACT

A fiberoptic feedthrough fastener and method for forming same comprising sliding a first and second sections of heat shrink tubing up a fiberoptic cable beyond a fastening point. The jacket of the cable is then stripped off at the fastening point, the strength member is stripped off slightly beyond the fastening point, and the exposed strength member is folded back away from the buffered fibers. A section of protective tubing is slid over the exposed buffered fibers until it abuts the end of the jacket. The second section of heat shrink tubing is slid down the cable and the protective tubing. The exposed strength member is caught by the second section of heat shrink tubing and pulled over and about the protective tubing. The second section of heat shrink tubing is then secured about the protective tubing and exposed strength member. The first section of heat shrink tubing is slid down the cable and secured about the protective tubing and jacket forming a gap of exposed strength member between the two sections of heat shrink tubing. The entire assembly is placed in an injection mold cavity and a PVC mold is formed. The exposed aramid fibers in the strength member gap adhere to the PVC mold as it cools. The PVC mold is configured with a fastening path that conforms to an aperture in a housing. Two protrusions are included on the PVC mold that provide a grommet-like effect allowing the feedthrough fastener to be secured to the housing.

43 Claims, 4 Drawing Sheets

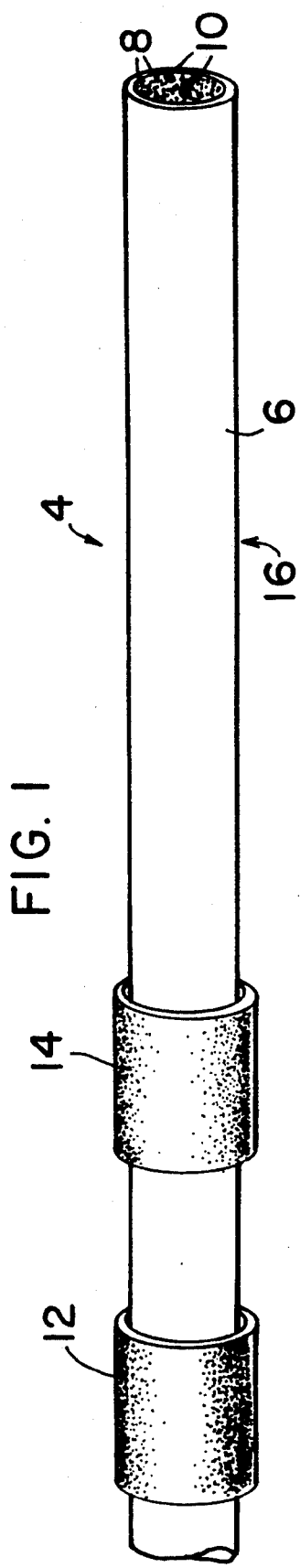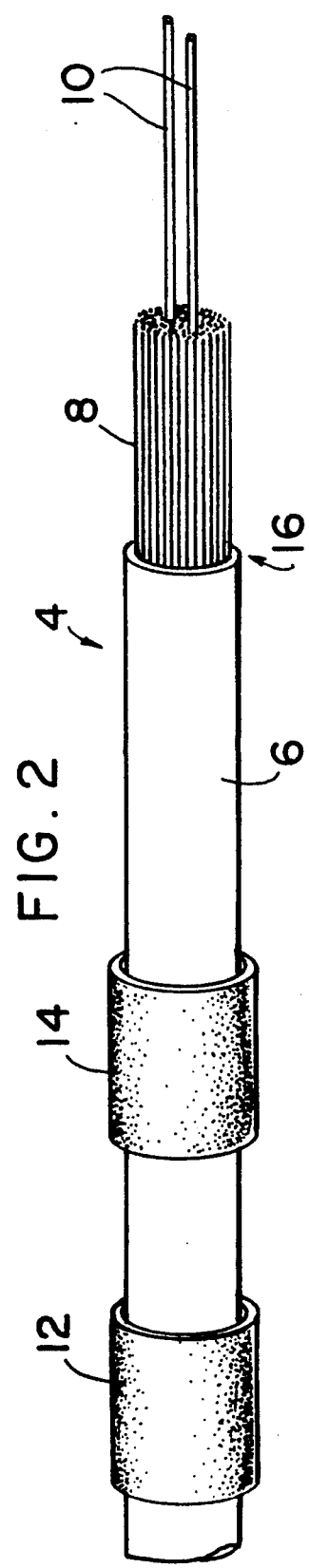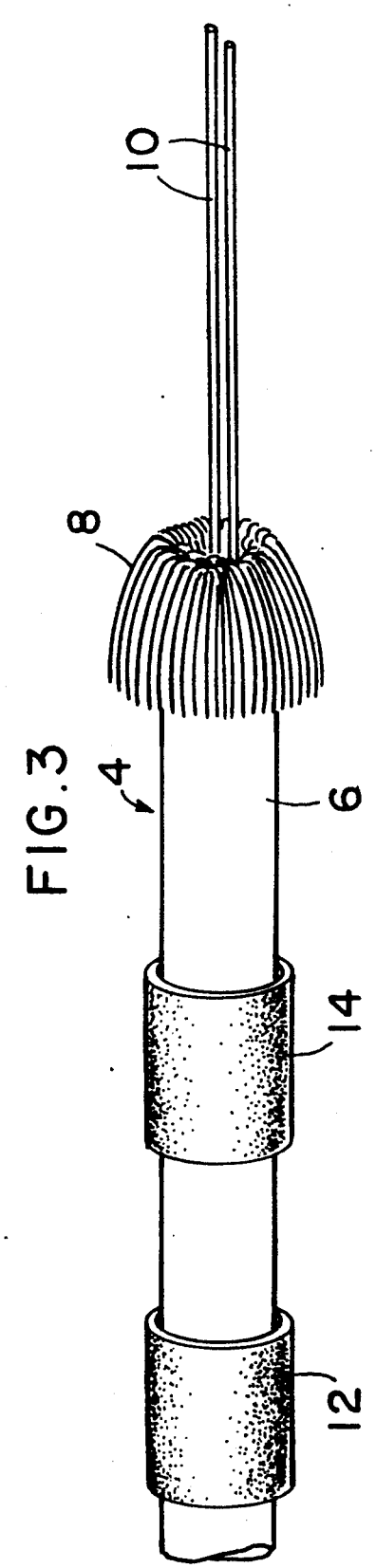

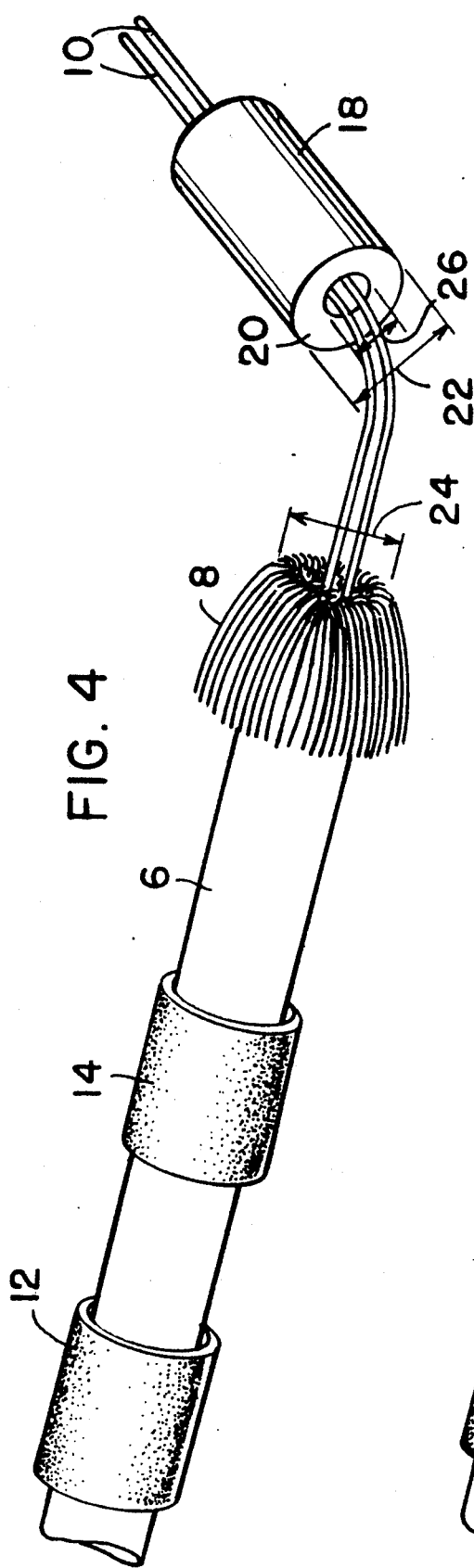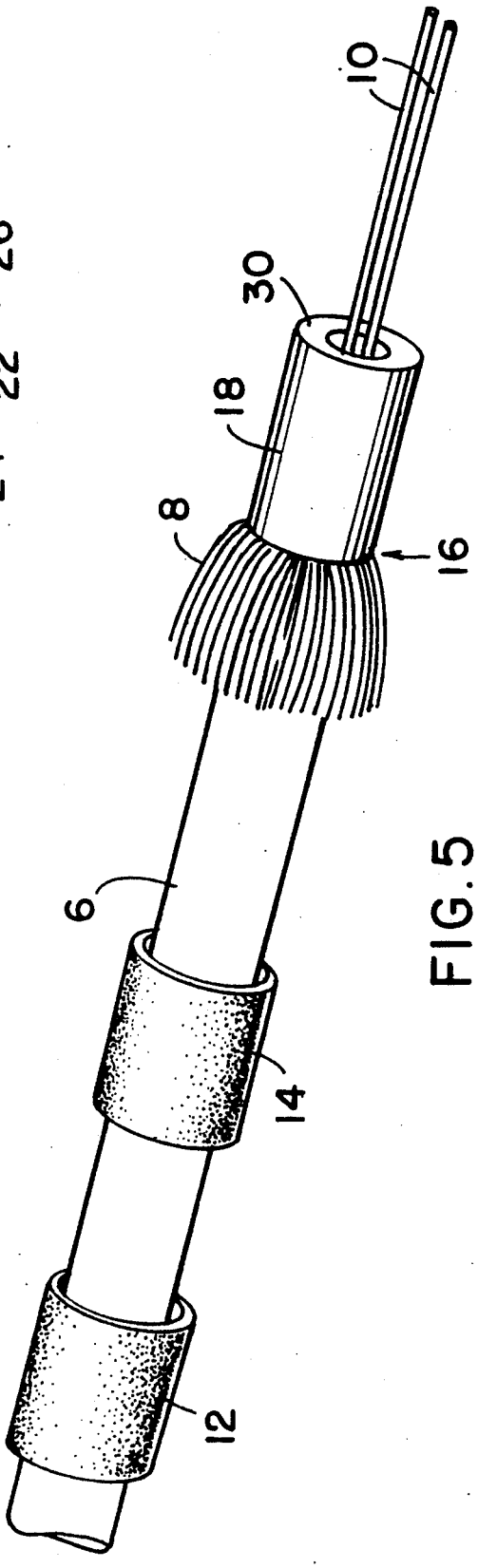

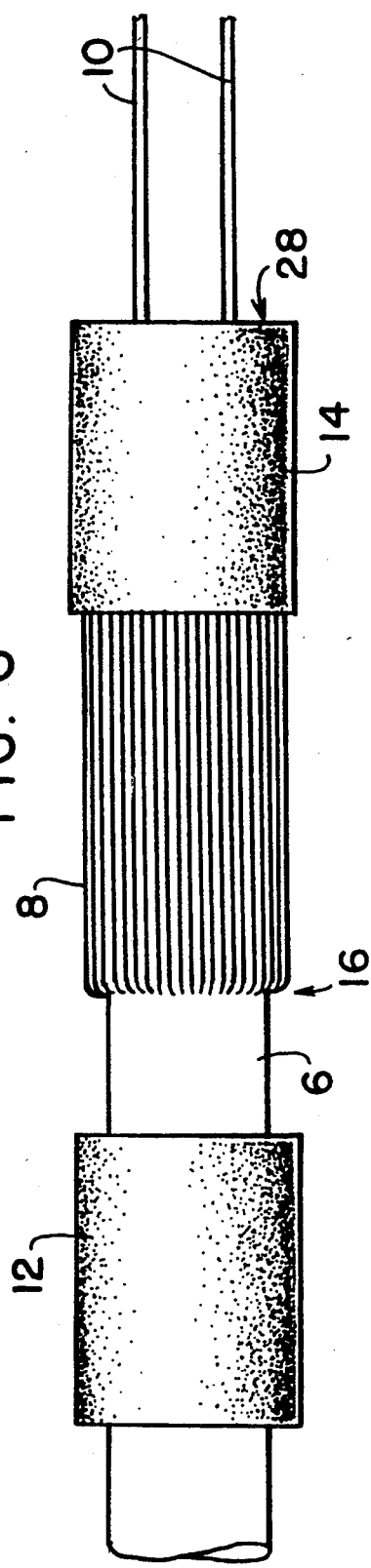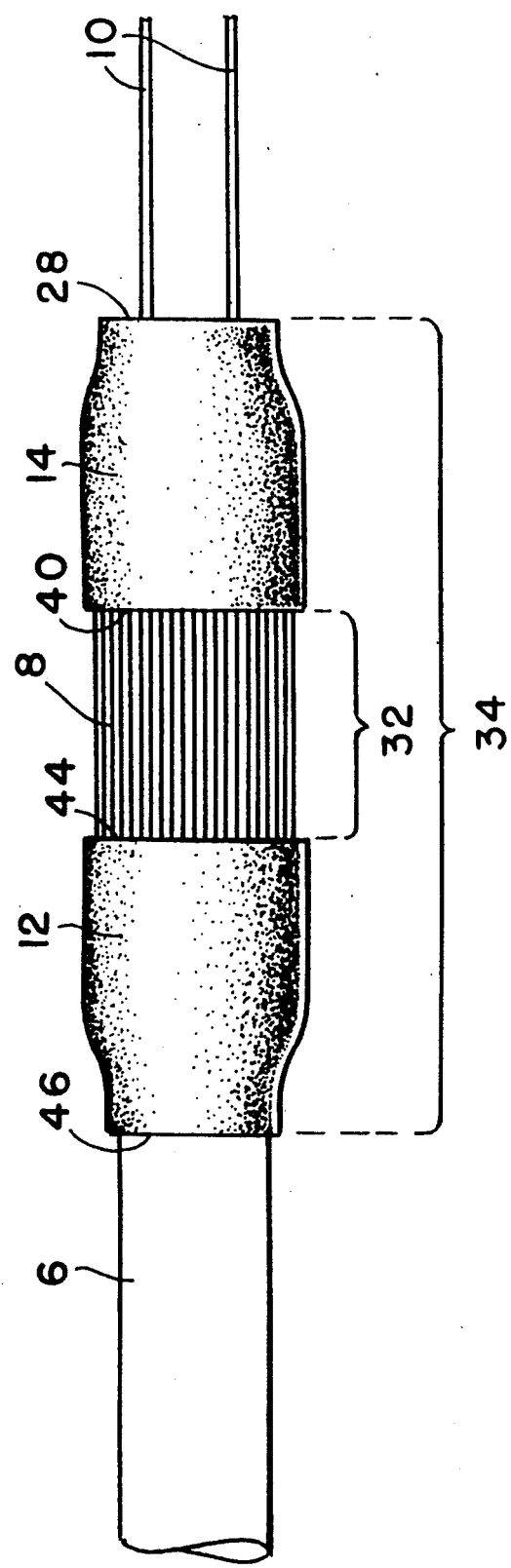

FIBEROPTIC CABLE FEEDTHROUGH FASTENER AND METHOD FOR FORMING SAME

CROSS-REFERENCE TO RELATED APPLICATION

This application is a continuation-in-part of co-pending application Ser. No. 696,238, filed May 6, 1991, has been allowed.

BACKGROUND OF THE INVENTION

1. Field of the Invention

This invention relates in general to a feedthrough fastener and a method for forming same for fiberoptic cable systems containing buffered fibers and more particularly to a feedthrough fastener and a method for forming same utilizing an injection mold wherein the buffered fibers are not subject to stress during or after the injection molding process and wherein the injection mold allows the integrity and support of the strength member of the cable system to be maintained in the feedthrough fastener.

2. Description of the Prior Art

Fiberoptic cables are quickly displacing copper wiring as the medium of choice in local area network systems. The fiber environment, however, raises certain unique problems resulting from the delicate nature of fibers. For example, fiberoptic systems are extremely susceptible to signal loss or distortion, and even permanent damage to the fiber, when excessive bending of the fiber occurs or when forces such as pulling or crushing are exerted on the fiber.

These problems have been addressed by the placement of fibers within a cable system comprised of an outer jacket, which in turn surrounds a strength member comprised of aramid fibers, such as kevlar, which in turn surrounds one or more buffered fibers. This cable system allows stress from pulling and crushing to be absorbed by the outer jacket and strength member. In addition, these components provide a certain degree of rigidity to the cable, thereby protecting against extreme bending. Even with these features, however, fiberoptic cables must still be handled with care.

The delicate nature of fibers is a factor that comes into play when the end of a fiber is terminated or spliced. A certain length of the outer jacket and strength member is often stripped from the buffered fiber at the termination or splice point. The remaining length of exposed buffered fiber is generally spliced to another section of exposed buffered fiber or attached to a fiberoptic connector. The section of exposed buffered fiber, however, is highly susceptible to damage from external forces.

Some protection is afforded to the section of exposed buffered fiber by enclosing this section in a housing such as a wallbox. Such housings are well known and examples are disclosed in U.S. Pat. Nos. 4,874,904 and 4,850,901. While these housings protect the exposed buffered fiber from direct forces, the risk still exists of damage to the exposed buffered fiber from forces exerted on remote sections of the cable system.

For example, a pulling force exerted on a remote section of the cable system may be transmitted axially along said cable system and be absorbed by the exposed buffered fiber at its splice/connection point. This force can seriously damage the fiber since it must absorb this force without the aid of the strength member of the cable system. A pulling force may also be exerted in a direction that results in a sharp bend in the cable system at the point it enters the housing, i.e., about the edge of the aperture in said housing. Such a bend, even if at a point where the cover and strength member still surround the buffered fibers, can damage the fiber if it is severe enough.

These problems are well known and a number of prior art methods and devices have been used to attempt to resolve these problems. Each of these methods or devices, however, has disadvantages and fails to adequately protect the integrity of the buffered fibers.

In particular, it has generally been recognized that it is desirable to maintain the protection afforded by the cable system's strength member in order to protect the integrity of the buffered fibers. For example, one method that is used is to secure the cable system's strength member to the housing. This is done, for example, by tying an exposed length of the aramid fibers to a portion of the housing. This method generally fails to maintain the same degree of protection afforded by the strength member to the cable system since it doesn't eliminate stress on the buffered fibers when external forces are imposed. Furthermore, it fails to address the damage caused to the buffered fibers if severe bending occurs about the aperture to the housing.

Other attempts to resolve these problems have utilized various devices wherein compression pressure on the cable system is utilized to hold it in place within the housing and as some protection against remote forces. For example, cable ties—as disclosed in U.S. Pat. No. 4,875,881, grommets—as disclosed in U.S. Pat. No. 4,717,231, and clamps—as disclosed in U.S. Pat. No. 4,812,004 have been used to secure cable systems to housings. The use of each of these devices has two primary disadvantages.

First, regardless of how tightly each of these devices hold the cable system, there is no direct connection between the device and the cable system's strength member. Accordingly, some degree of the protection afforded by the strength member is lost. Second, inherent in the use of a compression force to secure the cable system in place is some risk of damaging the buffered fibers and their signal paths as a result of a strong compression force. More likely, however, this compression force will eliminate the free movement of the buffered fibers within the cable system; thereby causing the jacket, strength member and buffered fibers to act as one element. When this occurs, a remote force exerted on the cable system that would otherwise be absorbed by the jacket and strength member will also be absorbed by the buffered fibers, resulting in damage to the fibers.

A relatively quick and inexpensive method of securing the cable system to the housing would be to utilize an injection mold shaped to conform to the aperture in the housing and formed about the cable system. The use of an injection mold for this purpose has been limited, however, inasmuch as the injection molding process may exert a substantial amount of stress on those elements within the interior of the mold.

SUMMARY OF THE INVENTION

It is therefore an object of the present invention to overcome the aforementioned disadvantages of prior art systems and provide a relatively inexpensive fiberoptic cable feedthrough fastener and a relatively quick and inexpensive method for forming this device utilizing injection molding wherein the integrity and freedom of the individual fibers and signal paths is maintained.

It is a further object of the present invention to provide a relatively inexpensive fiberoptic cable feedthrough fastener and a relatively quick and inexpensive method for forming this device utilizing injection molding wherein the integrity of the cable system's strength member is maintained through the fastening point between the cable system and the item it is fastened to.

These and other objects of the present invention are achieved in a feedthrough fastener and the method for forming this device which comprises sliding a first section and a second section #of heat shrink tubing up a fiberoptic cable beyond a fastening point. The jacket of the cable is then stripped off at the fastening point, the strength member is then stripped off the cable slightly beyond the fastening point, and the exposed strength member is then folded back away from the buffered fibers. Thereafter, a section of protective tubing is slid over the exposed buffered fibers until it abuts the end of the jacket. The second section of heat shrink tubing is then slid down the cable and over the protective tubing. When this is done the exposed strength member is caught by the second section of heat shrink tubing and pulled over and about the protective tubing. The second section of heat shrink tubing is then secured about the protective tubing, holding the exposed strength member in place. The first section of heat shrink tubing is then slid down the cable and secured about both the protective tubing and jacket so that a gap of exposed strength member exists between the two sections of heat shrink tubing. Thereafter, the entire jacket, heat shrink tubing, protective tubing assembly is placed in an injection mold cavity and a PVC mold is formed about the fastening point. As this is done the exposed aramid fibers in the strength member gap adhere to the PVC mold as it cools. The section of protective tubing protects the exposed buffered fibers during this process. The PVC mold is configured with a fastening path that conforms in size, shape and width to an aperture in a housing. Two protrusions are also included on the PVC mold, on either side of the fastening path, that provide a grommet-like effect allowing the feedthrough fastener to be secured to the housing at the aperture.

These and other novel features and advantages of the invention will be described in greater detail in the following detailed description.

BRIEF DESCRIPTION OF THE DRAWINGS

In the drawings, wherein similar reference numerals denote similar elements throughout the several views thereof:

FIG. 1 is a view of a multi-fiber fiberoptic cable with a first section and a second section of heat shrink tubing placed about said cable.

FIG. 2 is a view of a multi-fiber fiberoptic cable and said sections of heat shrink tubing wherein said cable has its jacket and its strength member stripped off to allow for the forming of the present feedthrough fastener.

FIG. 3 is a view of the multi-fiber fiberoptic cable shown in FIG. 2 wherein said strength member has been positioned to allow placement of a protective tubing about said buffered cables.

FIG. 4 is a view of said protective tubing being slid over said buffered fibers.

FIG. 5 is a view of said protective tubing in its final position about said buffered fibers wherein said protective tubing abuts the jacket of said multi-fiber fiberoptic cable.

FIG. 6 is a view of said second section of heat shrink tubing secured about said protective tubing wherein it holds said strength member in place about said protective tubing.

FIG. 7 is a view of said first section of heat shrink tubing secured about said protective tubing and said jacket wherein it also holds said strength member in place about said protective tubing.

DETAILED DESCRIPTION OF THE INVENTION

Figure 8:
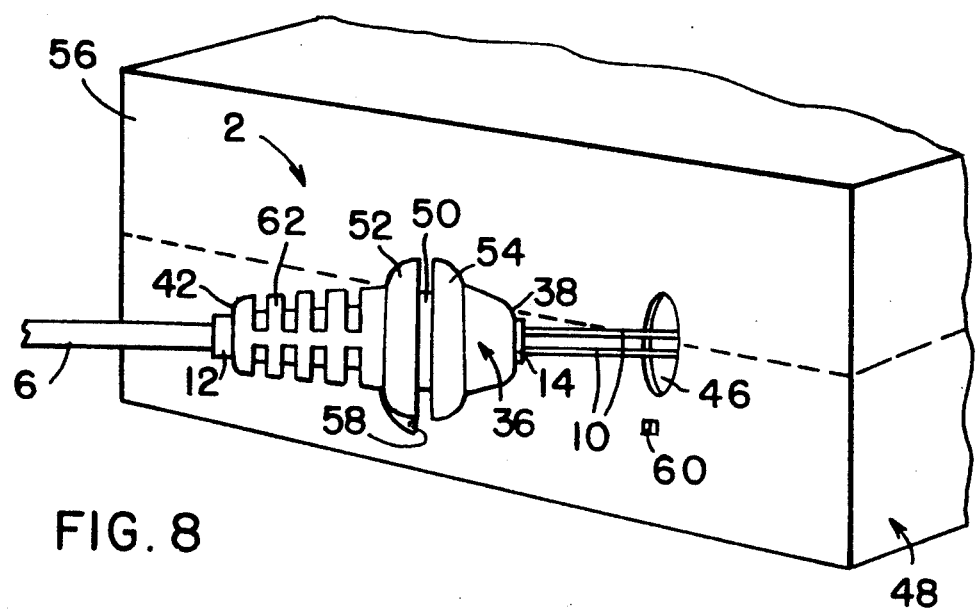
FIG. 8 is an overhead view of the present feedthrough fastener with said PVC mold.

This detailed description of the invention describes the present invention utilizing for illustration a multi-fiber fiberoptic cable containing two individual buffered fibers. This detailed description is not intended to limit the scope of the present invention, which may be utilized in connection with single-fiber fiberoptic cables or with multi-fiber fiberoptic cables containing any number of individual buffered fibers. In such a situation the preferred embodiment dimensions set forth herein would vary with an increase in the number of buffered fibers.

The present feedthrough fastener 2 is formed as follows. Referring now to the drawings, and in particular to FIGS. 1 through 3, there is shown a multi-fiber fiberoptic cable 4 comprised of an outer jacket 6, which surrounds a strength member 8 comprised of aramid fibers such as kevlar. The strength member 8 in turn surrounds two buffered fibers 10.

The initial step in forming the present feedthrough fastener 2 is to place a first section of heat shrink tubing 12 and a second section of heat shrink tubing 14 about the exterior of the end of said cable 4 and then sliding said first and second sections of heat shrink tubing 12,14 a sufficient distance along said cable 4 so that they are beyond a fastening point 16. In the preferred embodiment of the present invention said first section of heat shrink tubing 12 is 1.25 inches in length and said second section of heat shrink tubing 14 is 1 inch in length. Furthermore, in the preferred embodiment of the present invention said first and second sections of heat shrink tubing 12,14 have adhesive interiors.

The next step in forming the present feedthrough fastener 2 is to prepare the cable 4 as shown in FIGS. 2 and 3. The jacket 6 is stripped off the cable 4 at the fastening point 16 leaving the strength member 8 exposed from said fastening point 16 to the end of the buffered fibers 10.

Thereafter the exposed strength member 8 is also stripped off at a point beyond the fastening point 16 leaving a section of exposed strength member 8 surrounding the buffered fibers 10 and only the buffered fibers 10 extending beyond the end of the strength member 8. In the preferred embodiment of the present invention, the section of exposed strength member is 1 inch in length.

The next step in forming the present feedthrough fastener 2 is to fold said strength member 8 away from the buffered fibers 10. While no particular method need be used to accomplish this, it has been found that subjecting the end of the strength member 8 to a puff of air will generally result in the necessary movement of the strength member 8. It is necessary to fold the strength member 8 away from the buffered fibers 10 because the following step of the present method requires that a section of protective tubing 18 be slid over said buffered fibers 10, as shown in FIGS. 4 and 5. If said strength member 8 is not folded back away from the buffered fibers 10, then said strength member 8 may slide into the interior of said protective tubing 18 as said protective tubing 18 is slid onto said buffered fibers 10. Otherwise, said strength member 8 might be crushed between the end of said protective tubing 18 and the end of the jacket 6 as they abut.

As just mentioned, the next step in forming the present feedthrough fastener 2 is to place a section of protective tubing 18 about the buffered fibers 10. As shown in FIG. 4 and 5, the section of protective tubing 18 is slid over the buffered fibers 10 up to the point a first end 20 of the protective tubing 18 abuts the end of said jacket 6. As shown in FIG. 5, the aramid fibers of said strength member 8 extend from the interior of said jacket 6 between the end of said jacket 6 and first end 20 of said protective tubing 18 to the exterior of said protective tubing 18. In the preferred embodiment of the present invention, the section of protective tubing 18 is 1.5 inches in length.

The outer diameter 22 of said protective tubing 18 must be equal to or greater in size than the diameter 24 of said jacket 6 to ensure that said protective tubing 18 does not slide under said jacket 6 instead of abutting the end of said jacket 6. Also, the inner diameter 26 of said protective tubing 18 must be equal to or less in size than the diameter 24 of said jacket 6 to ensure that said protective tubing 18 does not slide over said jacket 6 instead of abutting the end of said jacket 6. Said protective tubing 18 must be heat resistant and capable of withstanding a compression force of 700 p.s.i., which is the pressure applied within the mold cavity during the injection molding process. In the preferred embodiment of the present invention, said protective tubing 18 is comprised of fiberboard tubing having a minimum wall thickness of 0.025 inches and an inner diameter of 0.150 inches. Said fiberboard tubing has the advantages of being relatively inexpensive and is nonabrasive to the buffer on the glass of the buffered fibers 10.

The next step in forming the present feedthrough fastener 2 is to slide said second section of heat shrink tubing 14 down the cable 4 so that it is positioned about the exterior of said protective tubing 18. As the second section of heat shrink tubing 14 is slid down the cable 4 it catches the aramid fibers of the strength member 8 and pulls said strength member 8 over and about the exterior of said protective tubing 18 as shown in FIG. 6. The second section of heat shrink tubing 14 is positioned about the exterior of said protective tubing 18 in such a manner that a section of strength member 8 is left exposed about the exterior of the protective tubing 18 between said jacket 6 and said second section of heat shrink tubing 14. In the preferred embodiment of the present invention said second section of heat shrink tubing 14 is positioned about the protective tubing 18 so that the outer edge 28 of said heat shrink tubing 14 aligns with or extends slightly beyond the second end 30 of said protective tubing 18. As more fully described below, this requirement ensures that the injection mold will be shut off about the second section of heat shrink tubing 14 rather than directly on said protective tubing 18, thereby avoiding the risk of crushing said protective tubing 18 at said shut off point. Heat is then applied to the second section of heat shrink tubing 14 to secure it in place about the protective tubing 18 and securing the strength member 8 in place between said heat shrink tubing 14 and said protective tubing 18.

The next step of the present method is to slide said first section of heat shrink tubing 12 down the cable 4 so that a portion of said first section of heat shrink tubing 12 is positioned about the exterior of said protective tubing 18 and the remaining portion of said first section of heat shrink tubing 12 is positioned about the exterior of said jacket 6. As said first section of heat shrink tubing 12 is positioned about the exterior of said protective tubing 18, it must not abut or overlap the second section of heat shrink tubing 14. As shown in FIG. 7, this requirement results in a gap 32 of exposed strength member 8 being formed between the two sections of heat shrink tubing 12, 14. In the preferred embodiment of the present invention, this gap 32 of exposed strength member 8 is at least 0.25 inches in length. Heat is then applied to the first section of heat shrink tubing 12 to secure it in place about the protective tubing 18 and jacket 6. The resulting path of the strength member 8 forms a zig zag pattern from the interior of said jacket 6, between the ends of said jacket 6 and said protective tubing 18, and along the exterior of said protective tubing 18. This zig zag in the path of the strength member 8 helps absorb, and negate the effect of, axial forces exerted on remote sections of the cable system.

Figure 9:
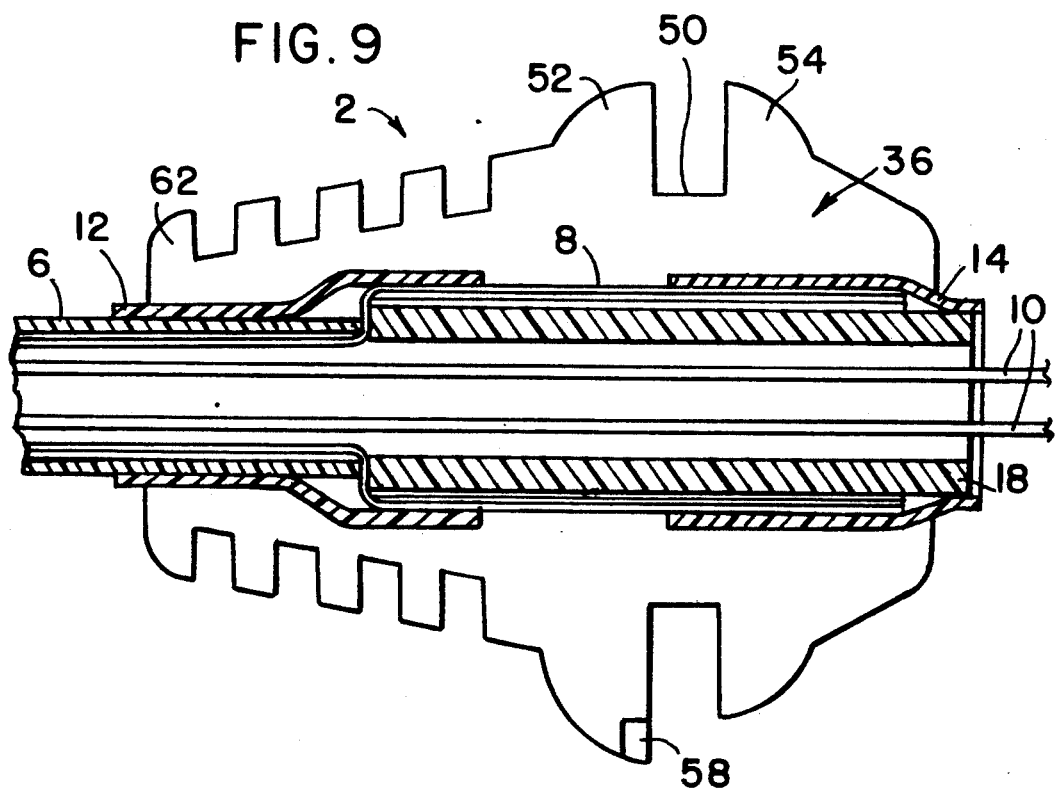
FIG. 9 is a cross-sectional view of the present feedthrough fastener.

As shown in FIGS. 7, 8 and 9, the final step in forming the present feedthrough fastener 2 is the encapsulation of the entire cable, heat shrink tubing, protective tubing assembly 34 in a polyvinyl chloride (PVC) mold 36 by means of an injection molding process. The assembly 34 is placed in an injection mold cavity and the PVC material is injected into it.

A first end 38 of said PVC mold 36 does not extend beyond the second end 30 of the protective tubing 18, thereby avoiding damage to the buffered fibers 10 during the injection molding process. Furthermore, in the preferred embodiment of the present invention, said first end 38 of the PVC mold 36 extends beyond the inner edge 40 of said second section of heat shrink tubing 14 but does not extend beyond the outer edge 28 of said second section of heat shrink tubing 14. By shutting off the injection mold about the pliant heat shrink tubing the risks of crushing the protective tubing 18 or bleeding PVC material out of the mold are minimized. In addition, in the preferred embodiment of the present invention, a second end 42 of the PVC mold 36 extends beyond the inner edge 44 of said first section of heat shrink tubing 12. It does not, however, extend beyond the outer edge 46 of the first section of heat shrink tubing 12 on the cable 4 and in fact terminates about the first section of heat shrink tubing 12 at a point said tubing 12 is secured about the cable jacket 6, thereby keeping the PVC mold 36 from melting and adhering to the jacket 6. This feature maintains the aesthetic appearance of the device and avoids the chance of such melting and adhering causing a stress on the buffered fibers 10 due to a restriction on the jacket 6. The higher temperature rating of the heat shrink tubings 12, 14 and the protective tubing 18, precludes the PVC mold 36 from adhering thereto. Rather, the PVC mold 36 is held in place about the assembly 34 by the compression/gripping action of the PVC mold 36.

The integrity and protection afforded by the strength member 8 of the cable system is maintained throughout the feedthrough fastener 2 as a result of the exposed aramid fibers of said strength member 8 in said gap 32 being captured by the PVC mold 36 as the mold 36 hardens. Accordingly, the strength member 8 in conjunction with the PVC mold 36 provide nearly the same protection as if a continuous strength member ran throughout the feedthrough fastener 2.

The integrity and freedom of the buffered fibers 10, on the other hand, results from the use of the protective tubing 18. As previously noted, the section of protective tubing 18 extends about the entire section of exposed buffered fibers 10 within the interior of said PVC mold 36. This feature permits the protective tubing 18 to provide the protection needed by the buffered fibers 10 from the stress of the injection molding process. The temperature rating of the protective tubing 18 precludes the PVC mold 36 from adhering to it and it is sufficiently rigid to preclude crushing from the compression force of the injection molding process, thereby avoiding stress to the buffered fibers 10.

In the preferred embodiment of the present invention, the injection molding process used utilizes a PVC with a rating of V-O at 105° C. and a durometer or hardness of Shore "A" 84.

The fastening aspect of the present invention is accomplished by configuring the exterior of said PVC mold 36 to conform with an aperture 46 in a housing 48. In particular, said PVC mold 36 is formed with a fastening path 50 that conforms in size, shape and width to said aperture 46 of said housing 48. On either side of said fastening path 50 said PVC mold 36 is formed with a first protrusion 52 and a second protrusion 54, both of said protrusions 52, 54 extending above said fastening path 50. In the preferred embodiment of the present invention said first protrusion 52 and said second protrusion 54 conform in shape to said fastening path 50.

The housing 48 may then be closed about said feedthrough fastener 2 so that said aperture 46 surrounds the fastening path 50. When this is done said first protrusion 52 abuts the exterior of the face 56 of said housing 48 and said second protrusion 54 abuts the interior of the face 56 of said housing 48. The grommet-like effect resulting from said first and second protrusions 52, 54 secures the feedthrough fastener 2 within said housing. Accordingly, when a force is exerted upon a remote section of the cable system, it will be absorbed by the interconnected combination of the strength member 8, PVC mold 36 and housing 48 rather than by the buffered fibers 10.

An additional feature that may be provided for in the configuration of the PVC mold 36 is a non-rotating lip 58. Rotation of the feedthrough fastener 2 within the aperture 46 of said housing 48 may occur if the aperture 46, and therefore the fastening path 50, are circular in shape. Such rotation should be avoided, however, since it may result in damage to said buffered fibers 10. Said non-rotating lip 58 is situated on said PVC mold 36 so that it will abut an opposing ledge 60 on said housing 48, the combination of these two elements precluding rotation.

As can be seen from the above, the use of an injection molding process provides a relatively quick and inexpensive means for designing and manufacturing feedthrough fasteners that can be used with any size or shaped apertures. The use of an injection molding process also allows for the inclusion of other features on said feedthrough fastener 2.

For example, in the preferred embodiment of the present invention, a strain relief member 62 may be included on the PVC mold 36. The strain relief member 62 helps protect against the buffered fibers 10 from being damaged by sharp bends in the cable at the edge of the mold 36. Furthermore, the use of an injection molding process allows labelling to be placed directly on the PVC mold 36 itself, thereby avoiding certain incidental costs associated with manufacturer's or technical labelling requirements. Finally, it should be noted that the present invention may also be utilized in connection with multimode cables, wherein a fiberoptic cable is included. An example of a multimode cable is a trimedia cable having coaxial, copper and fiberoptic cables therein.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for forming a feedthrough fastener for a fiberoptic cable, said cable comprised of an outer jacket surrounding a strength member of aramid fibers which in turn surrounds one or more buffered fibers, which comprises:
    (A) sliding a first section of heat shrink tubing and a second section of heat shrink tubing over said cable and beyond a fastening point,
    (B) preparing the cable by
        (i) stripping off the cable jacket at said fastening point,
        (ii) stripping off the strength member at a point beyond the fastening point,
        (iii) folding the exposed strength member away from the buffered fibers,
    (C) sliding a protective tubing about the buffered fibers such that a first end of said protective tubing abuts the end of the cable jacket, said protective tubing being heat resistant and capable of withstanding a compression force of 700 p.s.i., and said protective tubing having a wall with an inner diameter no greater than the outer diameter of said jacket and an outer diameter no less than the inner diameter of said jacket,
    (D) sliding said second section of heat shrink tubing down said cable and positioning it about said protective tubing such that the aramid fibers of said exposed strength member are caught by said second section of heat shrink tubing and pulled over and about said protective tubing,
    (E) securing said second section of heat shrink tubing about said protective tubing such that said strength member is secured in place between said second section of heat shrink tubing and said protective tubing and such that a section of exposed strength member exists between the end of the cable jacket and the second section of heat shrink tubing,
    (F) sliding said first section of heat shrink tubing down said cable and positioning it about said protective tubing and said cable jacket,
    (G) securing said first section of heat shrink tubing about said protective tubing and said cable jacket such that a gap of exposed strength member exists between said first section of heat shrink tubing and said second section of heat shrink tubing, (H) encapsulating the cable, heat shrink tubing and protective tubing assembly in a PVC mold by means of an injection molding process such that the aramid fibers in the gap of exposed strength member are captured by the PVC mold as said mold hardens, such that a first edge of said PVC mold does not extend beyond the outer end of said protective tubing, and such that said PVC mold is configured with
  (i) a fastening path conforming in size, shape and width to a preexisting aperture in a housing, and
  (ii) a first protrusion positioned on one side of said fastening path and a second protrusion positioned on the opposing side of said fastening path, each of said first and second protrusions extending above said fastening path.

2. The method recited in claim 1 wherein said first section of heat shrink tubing and said second section of heat shrink tubing have adhesive interiors.

3. The method recited in claim 1 wherein said first section of heat shrink tubing is 1.25 inches in length.

4. The method recited in claim 1 wherein said second section of heat shrink tubing is one inch in length.

5. The method recited in claim 1 wherein the aramid fibers of said strength member are kevlar.

6. The method recited in claim 1 wherein the strength member is stripped off at a point one inch beyond the fastening point.

7. The method recited in claim 1 wherein the protective tubing is a fiberboard tubing having a minimum wall thickness of 0.025 inches and an inner diameter of 0.150 inches.

8. The method recited in claim 1 wherein the protective tubing is 1.5 inches in length.

9. The method recited in claim 1 wherein the outer edge of said second section of heat shrink tubing aligns with or extends slightly beyond the outer edge of said protective tubing.

10. The method recited in claim 1 wherein the gap of exposed strength member between the secured first section of heat shrink tubing and the secured second section of heat shrink tubing is at least 0.25 inches in length.

11. The method recited in claim 1 wherein said first protrusion on said PVC mold and said second protrusion on said PVC mold each conform in shape to said fastening path.

12. The method recited in claim 1 wherein said injection molding process utilizes a PVC with a rating of V-O at 105° C. and a durometer of Shore "A" 84.

13. The method recited in claim 1 wherein said first edge of said PVC mold is terminated about said second section of heat shrink tubing.

14. The method recited in claim 1 wherein a second edge of said PVC mold is terminated about said first section of heat shrink tubing at a point where said first section of heat shrink tubing is secured about the cable jacket.

15. The method recited in claim 1 wherein said PVC mold is formed with a strain relief member.

16. The method recited in claim 1 wherein said PVC mold is formed with a non-rotating lip configured to abut a ledge on said housing.

17. A method for forming a feedthrough fastener for a fiberoptic cable, said cable comprised of an outer jacket surrounding a strength member of aramid fibers which in turn surrounds one or more buffered fibers, which comprises:

(A) sliding a first section of heat shrink tubing and a second section of heat shrink tubing over said cable and beyond a fastening point, each of said sections of heat shrink tubing having an adhesive interior,
(B) preparing the cable by
  (i) stripping off the cable jacket at said fastening point,
  (ii) stripping off the strength member at a point beyond the fastening point,
  (iii) folding the exposed strength member away from the buffered fibers,
(C) sliding a protective tubing comprised of a fiberboard tubing having a minimum wall thickness of 0.025 inches and an inner diameter of 0.150 inches about the buffered fibers such that a first end of said protective tubing abuts the end of the cable jacket, said protective tubing being heat resistant and capable of withstanding a compression force of 700 p.s.i., and said protective tubing having a wall with an inner diameter no greater than the outer diameter of said jacket and an outer diameter no less than the inner diameter of said jacket,
(D) sliding said second section of heat shrink tubing down said cable and positioning it about said protective tubing such that the aramid fibers of said exposed strength member are caught by said second section of heat shrink tubing and pulled over and about said protective tubing,
(E) securing said second section of heat shrink tubing about said protective tubing such that said strength member is secured in place between said second section of heat shrink tubing and said protective tubing and such that a section of exposed strength member exists between the end of the cable jacket and the second section of heat shrink tubing,
(F) sliding said first section of heat shrink tubing down said cable and positioning it about said protective tubing and said cable jacket,
(G) securing said first section of heat shrink tubing about said protective tubing and said cable jacket such that a gap of exposed strength member at least 0.25 inches in length exists between said first section of heat shrink tubing said second section of heat shrink tubing, and
(H) encapsulating the cable, heat shrink tubing and protective tubing assembly in a PVC mold by means of an injection molding process such that the aramid fibers in the gap of exposed strength member are captured by the PVC mold as said mold hardens, such that a first edge of said PVC mold does not extend beyond the outer edge of said protective tubing and terminates about said second section of heat shrink tubing, such that a second edge of said PVC mold terminates about said first section of heat shrink tubing at a point said first section of heat shrink tubing is secured about the cable jacket, and such that said PVC mold is configured with
  (i) a fastening path conforming in size, shape and width to a preexisting aperture in a housing, and
  (ii) a first protrusion positioned on one side of said fastening path and a second protrusion positioned on the opposing side of said fastening path, each of said first and second protrusions extending above said fastening path.

18. The method recited in claim 17 wherein said first section of heat shrink tubing is 1.25 inches in length.

19. The method recited in claim 17 wherein said second section of heat shrink tubing is one inch in length.

20. The method recited in claim 17 wherein the aramid fibers of said strength member are kevlar.

21. The method recited in claim 17 wherein the strength member is stripped off at a point one inch beyond the fastening point.

22. The method recited in claim 17 wherein the protective tubing is 1.5 inches in length.

23. The method recited in claim 17 wherein the outer edge of said second section of heat shrink tubing aligns with or extends slightly beyond the outer edge of said protective tubing.

24. The method recited in claim 17 wherein said first protrusion on said PVC mold and said second protrusion on said PVC mold each conform in shape to said fastening path.

25. The method recited in claim 17 wherein said injection molding process utilizes a PVC with a rating of V-O at 105° C. and a durometer of Shore "A" 84.

26. The method recited in claim 17 wherein said PVC mold is formed with a strain relief member.

27. The method recited in claim 17 wherein said PVC mold is formed with a non-rotating lip configured to abut a ledge on said housing.

28. A feedthrough fastener comprised of:
(A) a PVC mold formed by an injection molding process, said PVC mold being configured with
  (i) a fastening path conforming in size, shape and width to a preexisting aperture in a housing, and
  (ii) a first protrusion positioned on one side of said fastening path and a second protrusion positioned on the opposing side of said fastening path, each of said first and second protrusions extending above said fastening path, said PVC mold encapsulating a cable, heat shrink tubing and protective tubing assembly, and having captured exposed aramid fibers from said assembly as said PVC mold cooled, and said PVC mold not extending beyond the outer end of the protective tubing of said assembly,
(B) a cable, heat shrink tubing and protective tubing assembly comprising
  (i) a fiberoptic cable having an outer jacket surrounding a strength member of aramid fibers which in turn surrounds one or more buffered fibers wherein said jacket has been stripped from said cable at a fastening point and wherein said strength member has been stripped off the cable at a point beyond the fastening point,
  (ii) a protective tubing positioned about the buffered fibers, said protective tubing abutting the end of said jacket and said protective tubing having said strength member positioned about its exterior, said protective tubing being heat resistant and capable of withstanding a compression force of 700 p.s.i. and said protective tubing having a wall with an inner diameter no greater than the outer diameter of said jacket and an outer diameter no less than the inner diameter of said jacket,
  (iii) a first section of heat shrink tubing secured about the cable jacket and the protective tubing,
  (iv) a second section of heat shrink tubing secured about the protective tubing such that said strength member is secured in place between said second section of heat shrink tubing and said protective tubing, and
  (v) a gap of exposed strength member situated between said first section of heat shrink tubing and said second section of heat shrink tubing.

29. The feedthrough fastener recited in claim 28 wherein said first protrusion on said PVC mold and said second protrusion on said PVC mold each conform in shape to said fastening path.

30. The feedthrough fastener recited in claim 28 wherein the PVC mold is formed by an injection molding process utilizing a PVC with a rating of V-O at 105° C. and a durometer of Shore "A" 84.

31. The feedthrough fastener recited in claim 28 wherein a first edge of said PVC mold terminates about said second section of heat shrink tubing.

32. The feedthrough fastener recited in claim 28 wherein a second edge of said PVC mold terminates about said first section of heat shrink tubing at a point said first section of heat shrink tubing is secured about the cable jacket.

33. The feedthrough fastener recited in claim 28 wherein the PVC mold also comprises a strain relief member.

34. The feedthrough fastener recited in claim 28 wherein the PVC mold also comprises a nonrotating lip configured to abut a ledge on said housing.

35. The feedthrough fastener recited in claim 28 wherein the aramid fibers of said strength member are kevlar.

36. The feedthrough fastener recited in claim 28 wherein the strength member has been stripped off the cable at a point one inch beyond the fastening point.

37. The feedthrough fastener recited in claim 28 wherein the protective tubing is comprised of a fiberboard tubing having a minimum wall thickness of 0.025 inches and an inner diameter of 0.150 inches.

38. The feedthrough fastener recited in claim 28 wherein the protective tubing is 1.5 inches in length.

39. The feedthrough fastener recited in claim 28 wherein said first section of heat shrink tubing is 1.25 inches in length.

40. The feedthrough fastener recited in claim 28 wherein said second section of heat shrink tubing is one inch in length.

41. The feedthrough fastener recited in claim 28 wherein said first section of heat shrink tubing and said second section of heat shrink tubing have adhesive interiors.

42. The feedthrough fastener recited in claim 28 wherein said second section of heat shrink tubing is secured about said protective tubing such that the outer edge of said second section of heat shrink tubing aligns with or extends slightly beyond the outer edge of said protective tubing.

43. The feedthrough fastener recited in claim 28 wherein said gap of exposed strength member is at least 0.25 inches in length.

* * * * *